United States Patent [19]

Schapira et al.

[11] Patent Number: 5,567,236
[45] Date of Patent: Oct. 22, 1996

[54] COMPOSITION CONTAINING MATERIALS IMPROVING THE RHEOLOGICAL PROPERTIES OF CEMENT-BASED PRODUCTS

[75] Inventors: Joseph Schapira, Paris; Jean-Claude Cheminaud, Herblay; Jean-Jacques Gasse, Gaillon; Eric Hadzamann, Mouy; Joel Bonnin, Saint Denis, all of France

[73] Assignee: C F P I, Gennevilliers, France

[21] Appl. No.: 174,954

[22] Filed: Dec. 28, 1993

[30] Foreign Application Priority Data

Dec. 29, 1992 [FR] France .................................. 92 15864

[51] Int. Cl.$^6$ .......................... C04B 24/00; C04B 24/04; C04B 24/12
[52] U.S. Cl. ........................ 106/728; 106/727; 106/806; 106/808; 106/810; 106/823; 524/5; 524/650
[58] Field of Search ..................... 106/689, 696, 106/724, 725, 728, 802, 808, 823, 727, 806, 810; 524/2, 5, 650

[56]     References Cited

U.S. PATENT DOCUMENTS

| 4,284,433 | 8/1981 | Algnesberger et al. | 106/823 |
| 4,586,960 | 5/1986 | Iizuka | 106/823 |

FOREIGN PATENT DOCUMENTS

| 0 177 308 | 4/1986 | European Pat. Off. . |
| 0 222 932 | 5/1987 | European Pat. Off. . |
| 0 291 590 | 11/1988 | European Pat. Off. . |
| 0 326 125 | 8/1989 | European Pat. Off. . |
| 422222 | 4/1991 | European Pat. Off. . |
| 71 45264 | 7/1972 | France . |
| 91 13725 | 5/1992 | France . |
| 139929/79 | 2/1979 | Japan . |
| 58-156560 | 3/1982 | Japan . |
| 16851/85 | 1/1985 | Japan . |
| 62-83344 | 10/1985 | Japan . |
| 61-83659 | 4/1986 | Japan . |
| 61-83661 | 4/1986 | Japan . |
| 62-216950 | 9/1987 | Japan . |
| 1-246166 | 3/1988 | Japan . |
| 63-233032 | 9/1988 | Japan . |
| 2 194 528 | 3/1988 | United Kingdom . |
| 2 240 334 | 7/1991 | United Kingdom . |

OTHER PUBLICATIONS

Publication "Semento Gijutsu Nempo", 1983 (37), pp. 163–166 (no month).
Ramachandrian et al., Publication "Materials Structurals" 1989 (22), 128–107–11 (no month).
Kosmatka et al. "Design & Control of Concrete Mixtures", thirteenth edition, PCA, 1988 p. 65 (no month).

Primary Examiner—Helene Klemanski
Assistant Examiner—Michael Marcheschi
Attorney, Agent, or Firm—Larson & Taylor

[57]     ABSTRACT

Composition adapted to improve the rheological properties of cement-based products and more especially to increase the duration of the workability of concrete ready to use, characterized in that it comprises, in the form of a ternary mixture a superplasticizing or water-reducing agent having a dispersing effect, a stabilizing agent capable of forming a chelate with the calcium ions of the cement-based product, and a polycarboxylic polymer dispersing agent.

17 Claims, No Drawings

COMPOSITION CONTAINING MATERIALS IMPROVING THE RHEOLOGICAL PROPERTIES OF CEMENT-BASED PRODUCTS

This invention relates to a composition containing materials improving the rheological properties of cement-based products, namely grouts or slags, concretes and mortars.

It also relates to the said cement-based products containing the abovesaid composition containing materials.

It further relates to a specific process adapted to improve the rheological properties of the said cement-based products.

Cement-based products, namely grouts or slags, concretes and mortars, are generally delivered on site, ready to be used, with characteristics of manageability or workability corresponding to the those desired by the project manager.

In this respect, it is known to increase their fluidity by making them contain products denoted by the term of "superplasticizers"; these superplasticizers improve their workability while making it possible to resort to lower amounts of water at the time of mixing.

The workability is measured by the slump with the slump cone (ASTM standard C 143–66) or "slump test" or "slump measurement".

It is found that the superplasticizers commonly used lose their effectiveness 30 to 60 minutes after incorporation in the cement-based product, this duration varying according to the nature of the superplasticizer, the constituents of the cement-based product and the weather conditions when these products are used.

This loss of effectiveness, well known to those skilled in the art, is commonly expressed by what is called the "slump loss" (see, for example, the publications "Semento Gijutsu Nempo", 1983 (37), 163–6 and "Materials Structurals" 1989 (22), 128-107-11.

The slump loss, encountered with the superplasticizers of the prior art, means that the addition of the said superplasticizer must be entrusted to the drivers of the mixer trucks or to the work site personnel on arrival of the concrete or mortar at the site of use; as the work site personnel then have available little time to put the concrete in place, they may be driven to incorporate water in order to be able to complete a structure.

Now, additions of water result in all the benefit of the use of the superplasticizers being lost and always cause a reduction in the mechanical performance, in the compressive strength of the concrete and in the durability of the structures.

In order to control the slump loss, it has already been proposed to add, to the superplasticizer, a setting retarder consisting, for example, of a hydroxycarboxylic acid or its salts; however, it is found that, in this case, even if the hydration of the cement is retarded, it is difficult to avoid a physical aggregation of the concrete prepared; moreover, excessive charging with retarder no longer makes it possible for the formwork to be dismantled within a satisfactory time period and the strengths at young ages do not correspond to the current standards.

It has also been proposed (Showa Japanese Patent No. 139929/1979) to use superplasticizers of a formaldehyde-beta-naphthalenesulphonate condensate type in the granulated form; it is found, in this case, that the distribution of the granulated fluidifier in the cement-based product is not homogeneous and regions of weakness in the structures are observed; these regions of weakness are due locally to excessively low amounts or to overcharges of fluidifier.

It has also been proposed to resort to "slow-release" fluidifiers; the following have been used as such:

copolymers of maleic anhydride and of polyalkoxylated-alkylene derivatives (Japan Patent of the Company Showa No. 16851/85 and France Patent No. 81 13725), copolymers of olefin and of maleic anhydride such as isobam resins (Japan Patent of the Company Sanyo No. 63-233033 and Japan Patent of the Company Kao Corp. No. 62-83344), copolymers of acrylic esters and of vinylsulphonate (Japan Patent of the Company Takemoro Oils Fats No. 62-216950 and European Patent of the Company Nippon Shokubai No. 291590), copolymers of styrene and of maleic anhydride (Japan Patent of the Company Idemitsu No. 01-246166) and copolymers of indene and of maleic anhydride (Patent PCT/WO90/12642 of the Company Kawasaki Steel), ethyl acrylate emulsions (Japan Patent of the Company Japan Synthetic Rubber Co. No. 58-158560), sulphates and phosphates of poly(vinyl alcohols) (Japan Patent of the Company Kajima Corp. Daïchi No. 61-83659 and No. 61-83661).

These products of "slow-release" type are generally recommended in combination with superplasticizers of the naphthalenesulphonate and formaldehyde condensates (PNS) and sulphite-containing melamine type; however, if they sometimes reduce the slump loss, this result is always accompanied by an excessive air entraining effect and often by a prohibitive setting delay. Moreover, due to their initial chemical structure in which the carboxyl groups are partially or entirely esterified, they have little or no solubility in water and, on contact with the cement, the polymer or copolymer precipitates. This difficulty of use, the lack of stability on storage in aqueous solution as well as the often prohibitive price have restricted the development of the "slow-release" products.

The object of the invention is, especially, to overcome the disadvantages of the prior art and to provide a composition containing materials improving the rheological properties of cement-based products which can be incorporated in these products at the time of their preparation, especially in plants for the preparation of concrete, and which remains effective for a period at least equal to that for the transportation from the manufacturing plant to the site of use increased by that for putting the product into place on the site of use, the said composition being thus adapted to increase the duration of the workability of ready to use concrete.

And it is a merit of the Applicant Company to have found, surprisingly and unexpectedly, that it becomes possible not only to greatly increase, and to maintain for a period of time at least equal to that in question above, the rheological properties of cement-based products, in other words to increase the duration of the workability of ready to use concretes, but, moreover, not to excessively retard the setting of the said products and not to affect the times required for dismantling the formwork as well as the mechanical performances of the structures constructed using the said products, as soon as recourse was made, as compositions improving the rheological properties of the cement-based products, to a ternary mixture comprising:

a superplasticizing or water-reducing agent having a dispersing effect, a stabilizing agent capable of forming a chelate with the calcium ions of the cement-based product, and a polycarboxylic polymer dispersing agent.

The synergetic effect of the abovesaid ternary mixture with respect to slump loss is beyond comparison with the results which can be obtained by any binary combination of the three constituents.

Moreover, the said mixtures make it possible to confer on the cement-based products a workability sufficient to enable them to be pumped and/or put into place for at least two hours after their preparation, without unfavourably influencing the releasing time and without affecting the mechanical strengths of the structures constructed, as well after I day as after 7 and 28 days.

The composition according to the invention improving the rheological properties of products of the type in question is characterized in that the superplasticizing or water-reducing agent is selected from the group comprising:
  naphthalenesulphonate and formaldehyde condensates (PNS) in the form of alkali metals, alkaline-earth metals, ammonium, amines and alkanolamines salts,
  sulphite-containing melamines and modified melamines, and condensates of melamine, of sulphite-containing derivatives and of formaldehyde in the form of alkali metals and alkaline-earth metals salts,
  optionally purified lignosulphonates,
  polystyrenesulphonates and copolymers of sulphonated polystyrene and of maleic anhydride and
  mixtures of the abovesaid products;
the stabilizing agent capable of providing a stable chelate with the calcium ions of the cement-based product is selected from the group comprising:
  hydroxycarboxylic acids and their salts, more particularly those of the group comprising salicylic, citric, lactic, gluconic, glucoheptanoic, tartaric and muconic acids,
  aldoses and ketoses, more particularly sucrose and maize syrups,
  inorganic complexing agents, more particularly phosphates, borates and polyphosphates,
  organic complexing agents selected more particularly from the group comprising EDTA, NTA,
  antioxidizing agents, more particularly those from the group comprising ascorbic and isoascorbic acids and,
  preferably, derivatives of phosphonic acid of polymer structure which contain hydroxyl and/or amino and/or carboxylate groups, as well as one or several methylenephosphonic groups;
the polycarboxylic dispersing agent is selected from the group of products comprising water-soluble homopolymers and copolymers of ethylenic carboxylic acids and their alkaline salts, these polymers resulting from the polymerization or copolymerization of ethylenic acids selected from the group comprising acrylic, methacrylic, fumaric, maleic, itaconic, crotonic, aconitic, sinapic, mesaconic, undecylenic, angelic and hydroxyacrylic acids as well as maleic anhydride.

According to an advantageous embodiment of the composition according to the invention, the stabilizing agent, insofar as it consists of a derivative of phosphonic acid of polymer structure and insofar as it contains hydroxyl and/or amino and/or carboxylate groups and one or several methylenephosphonic groups, is a polymer compound of general formula:

$$\begin{array}{c} X_2PO_3CH_2 \\ \phantom{X_2PO_3CH_2}\diagdown \\ \phantom{XXXXXXXX}N-(R-N-)_nCH_2PO_3X_2 \\ \phantom{XXXXXXXXXXXXX}| \\ \phantom{X_2PO_3CH_2}\diagup \phantom{XXX} CH_2PO_3X_2 \\ X_2PO_3CH_2 \end{array} \quad (I)$$

in which:

n is an integer from 0 to 10, preferably from 0 to 4,

R represents a carbon chain of alkylene or alkylene oxide structure of formulae:

$$(R_1-O-R_2) \quad \text{or} \quad (R_1-\underset{\underset{OH}{|}}{C}H-R_2)$$

in which $R_1$ and $R_2$ are alkyl groups comprising at least two carbon atoms,

X represents a hydrogen atom, an alkali metal or alkaline-earth metal, the ammonium, a protonated amine or a protonated alkanolamine.

The modified polymer compounds of formula (I) can be obtained by addition of formaldehyde and orthophosphorous acid to the polymers resulting from the addition of aqueous ammonium to an olefin, an oxyolefin or to epichlorohydrin or one of its derivatives.

Mention may be made, as examples of preferred compounds of formula (I), of:

aminotri(methylenephosphonic) acid and its salts, ethylenediaminetetra(methylenephosphonic) acid and its salts, diethylenetriaminepenta(methylenephosphonic) acid and its salts, hexamethylenediaminetetra(methylenephosphonic) acid and its salts.

These products are marketed, in particular by the Company Monsanto Co. Under the trademark "DEQUEST".

According to another advantageous embodiment of the composition according to the invention, the stabilizing agent, insofar as it consists of a phosphonic acid derivative of polymer structure and insofar as it contains hydroxyl and/or amino and/or carboxylate groups and one or a number of methylenephosphonic groups, is a polymer obtained by modifying urea-formaldehyde condensates by addition of formaldehyde and orthophosphorous acid, the said polymer being represented by the general formula:

$$X_2O_3P-CH_2-[N-\underset{\underset{X_2O_3P}{|}}{\underset{CH_2}{|}}-\underset{O}{\overset{C}{\|}}-\underset{\underset{PO_3X_2}{|}}{\underset{CH_2}{|}}N-CH_2]_n-PO_3X_2 \quad (II)$$

in which:

n is an integer equal to or greater than 1,

X represents a hydrogen atom, an alkali metal or alkaline-earth metal, the ammonium, a protonated amine or a protonated alkanolamine.

According to another advantageous embodiment of the composition according to the invention, the stabilizing agent, insofar as it consists of a phosphonic acid derivative of polymer structure and insofar as it contains hydroxyl and/or amino and/or carboxylate groups and one or a number of methylenephosphonic groups, is a gem-hydroxyphosphonic compound of general formula:

$$\begin{array}{c} R_1 \\ | \\ HO-C-PO_3X_2 \\ | \\ R_2 \end{array} \quad (III)$$

in which:

$R_1$ represents a hydrogen atom or an alkyl group, $R_2$ represents a hydrogen atom, an alkyl group or the $PO_3X_2$ group, X represents a hydrogen atom, an alkali metal or alkaline-earth metal, the ammonium, a protonated amine or a protonated alkanolamine.

The compounds of formula (III) can be obtained by addition of orthophosphorous acid to an aldehyde or a ketone.

Mention may be made, as advantageous compounds of formula (III), of 1-hydroxyethylidene-1,1-diphosphonic acid and its salts.

According to another advantageous embodiment of the composition according to the invention, the stabilizing agent, insofar as it consists of a phosphonic acid derivative of polymer structure and insofar as it contains hydroxyl and/or amino and/or carboxylate groups and one or several methylenephosphonic groups, is a compound of general formula:

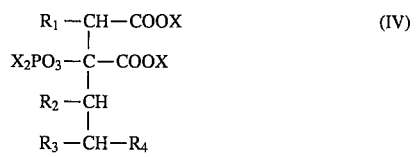

in which:

$R_1$ and $R_3$ represent a hydrogen atom or an alkyl group comprising from 1 to 4 carbon atoms, $R_2$ represents a hydrogen atom, an alkyl or carboxyalkyl group, $R_4$ represents a carboxyalkyl, carboxamido or cyano group and X represents a hydrogen atom, an alkali metal or alkaline-earth metal, the ammonium, a protonated amine or a protonated alkanolamine.

The stabilizing agents of formula (IV) can be prepared by use of conventional techniques; thus, it is possible to prepare them by reacting ethylenic compounds activated by means of an electron-withdrawing substituent, such as nitrile, carbonyl, carboxyl or carboxamido groups, with a phosphonoalkylsuccinic acid ester; this reaction is catalyzed by strong bases such as, for example, alkali metal alkoxides; the addition product is then saponified by heating in the presence of strong acids such as, for example, hydrochloric acid.

The abovesaid phosphonoalkylsuccinic esters can be obtained by conventional synthetic techniques such as, for example, additions of phosphorous acid diesters to maleic acid diesters.

For more details relating to the preparation of the compounds of formula (IV), reference may be made to French Patent No. 71 45264.

Mention may be made, as advantageous compounds of formula (IV), of the derivatives of 2-phosphonobutane-1,2-dicarboxylic acid, more particularly those marketed by the Company Bayer under the tradename "BAYHIBIT", such as, for example, 2-phosphonobutane-1,2,4-tricarboxylic acid and its alkali metal, alkaline-earth metal, ammonium, protonated amine or protonated alkanolamine salts.

According to another advantageous embodiment of the composition according to the invention, the polycarboxylic dispersing agent has a number-average molecular weight of 500 to 15,000, preferably of 500 to 10,000 and, more preferentially still, of 800 to 3500, determined by gel permeation chromatography (GPC).

Recourse can be made to conventional polymerization processes in order to prepare the abovesaid polycarboxylic dispersing agent; the polymerizations in question may be carried out in a solvent of the monomers used which are generally water-soluble; the polymerization is carried out in aqueous medium or, preferentially, in aqueous/alcoholic medium; use is then made of light alcohols (number of carbon atoms from 1 to 4) and preferentially isopropanol, although, in this case, the process is less economic because it leads to the necessity of removing the alcohol, generally by distillation; nevertheless, it is preferable to use an aqueous/alcoholic medium because, in contrast to what takes place in an aqueous medium, the polymerization is better controlled therein and leads to generally lower molecular masses.

The polymerization is initiated using a water-soluble initiator such as hydrogen peroxide, ammonium or potassium persulphates, and sulphates; a reducing agent such as sodium bisulphite is used as accelerator in combination with the initiator.

When the reaction is carried out in aqueous/alcoholic medium, use is made of peroxides such as benzoyl, lauroyl or cumene peroxide and also of azo compounds such as azobisisobutyronitrile.

The amounts of initiator used are very low, of the order of 0.1 to 10% by weight with respect to the weight of the monomers.

The polymerization is preferably carried out at a temperature between 30° and 100° C.

The polymerisate obtained is neutralized to a pH of 7 to 8 by a base which can be selected from alkali or alkaline-earth metal hydroxides, oxides, carbonates, aqueous ammonia, salts of protonated amines.

When the reaction has been carried out in aqueous/alcoholic medium, the alcohol is then removed by distillation.

The polymers thus obtained generally have a number average molecular mass between 500 and 20,000, determined by GPC.

The polycarboxylic dispersing agents suitable for being used to form the composition according to the invention are commercially available; they have, in addition to their good dispersing ability with respect to the inorganic constituents of cement-based products, a very good ability to sequester calcium.

Due to these two properties combined with the excellent dispersing ability of the superplacticizing agent and the stabilizing effect of the abovesaid polymers and phosphonic derivatives, the composition according to the invention confers, on cement-based products, properties which, in terms of workableness, are highly impressive and long lasting without affecting the strengths at any age of the structures obtained using these products.

According to an advantageous embodiment, the composition according to the invention contains:

from 5 to 95%, preferably from 50 to 90%, by weight of at least one superplasticizing agent especially selected from the group comprising alkali metals or alkaline-earth metals formaldehyde-naphthalenesulphonate condensates, alkali metals or alkaline-earth metals lignosulphonates, sulphite-containing melamines, alkali metals or alkaline-earth metals polystyrene-sulphonates and styrene-maleic anhydride copolymers in the form of their alkali metals or alkaline-earth metals salts, from 0.1 to 50% preferably from 0.1 to 25%, by weight of at least one stabilizing agent which chelates calcium ions especially selected from the group comprising polyalkylenepolyamino(methylenephosphonic) acids or salts, urea-formaldehyde condensates modified by addition of methylenephosphonic groups, gem-hydroxyphosphonic compounds and derivatives of 2-phosphonobutane-1,2-dicarboxylic acid, and from 5 to 95%, preferably from 5 to 80%, by weight of a polycarboxylic polymer dispersing agent especially consisting of an alkali metal polycarboxylate.

According to another advantageous embodiment, the composition according to the invention comprises from 5 to 40% by weight of an alkali metal polycarboxylate, from 0.1 to 20% by weight of a calcium-chelating stabilizing agent consisting of a polyalkylenepolyamino(methylenephosphonic) acid or its salts or a derivative of 2-phosphonobutane-1,2-dicarboxylic acid and, more particularly, 2-phosphonobutane-1,2,4-tricarboxylic acid and its salts, the complement to 100% by weight of the composition consisting of a superplasticizing agent, preferably an alkali metal of formaldehyde-naphthalenesulphonate condensate.

The composition according to the invention can be provided and be marketed in the form of a slightly alkaline aqueous solution with a pH of 7 to 8 and containing 40% by weight of dry matter. It can be used simultaneously with the superplasticizers of the prior art. At the time of its use, it must be uniformly homogenized with the other constituents of the cement-based product.

The composition according to the invention can also be provided and be marketed in the form of an particularly atomized powder; it can be used in this form during the manufacture of ready to be used cement-based products but which are stored in the dry state; it is then introduced into the manufacturing mixer which receives the other constituents of the cement-based product.

When the preparation of concretes or mortars in the wet state is concerned, it is preferable to introduce the composition according to the invention in the form of an aqueous solution, after humidification and impregnation of the concrete or mortar with the mixing water.

The composition according to the invention is incorporated in the cement at a concentration of 0.1 to 1.0% by weight of dry matter with respect to the cement. The exact amount of composition is determined depending on the specific composition of the cement and depending on the water charge, the nature of the aggregates and of the particle size distribution of the cement-based product.

The composition according to the invention can be used as superplasticizer of a cement-based product by incorporation at the time of the preparation, while maintaining a constant water charge; it can also be used as water-reducing agent for a cement-based product, especially for the preparation of high and very high performance concretes, and then makes it possible to ensure that the manageability (measured by slump) remains unchanging with respect to a control composition; it can also be used in oil drilling as a rheological agent of cementation grout.

The composition according to the invention improves the fluidification of cement-based products, namely mortars and concretes, slags and grouts; moreover, it makes it possible to maintain the rheology of these products over time without excessively retarding the setting nor negatively influencing the strengths at any period and particularly at young ages.

The composition according to the invention thus makes it possible for the operator to transport, work and place the cement-based products 2 hours after their preparation without postponing the due dates for releasing and for dismantling the formworks of the structures, nor affecting the strengths at any age of the said structures; moreover, this behaviour is achieved without causing entrainment of occluded air.

Cement-based products, namely grouts or slags, concretes and mortars, according to the invention are characterized in that they contain an effective amount of the composition according to the invention, it being understood that "effective amount" denotes that by which it is possible to confer, on cement-based products, the desired rheological properties; according to an advantageous embodiment, the effective amount represents a proportion from 0.1 to 1.0% by weight of dry matter with respect to the cement.

The process according to the invention is characterized in that a cement-based product is made to contain an effective amount, advantageously from 0.1 to 1.0% by weight of dry matter with respect to the cement either of the composition according to the invention, or of the constituents of this composition, the said constituents then being incorporated in the said cement-based product in relative proportions corresponding to those which are theirs in the said composition.

The invention will be yet better understood using the non-limiting examples which follow and in which advantageous embodiments of the invention are illustrated; the percentages and the information in parts are expressed by weight.

In these examples, the synergy obtained when the three constituents of the composition according to the invention are used has been demonstrated (Example 1), the influence of the nature of each of the constituents of the composition has been studied by successively varying the carboxylic polymer dispersing agent (Example 2), the stabilizing agent (Example 3) and the superplasticizing agent (Example 4), the influence of the proportions of each of the three constituents of the composition has been studied (Example 5), the water-reduction properties of the composition according to the invention have been studied (Example 6).

EXAMPLE 1

Demonstration of the existence of a synergy

First of all, different samples of approximately 30 litres were prepared, each containing normal plastic concrete in accordance with the AFNOR standard P 18 351, the preparation being carried out according to the protocol defined by the AFNOR standard P 18 404.

In order to do this, the following were introduced into a vertical axis mixer with a working volume of 75 litres: first large aggregates (975 kg/m$^3$ of concrete), then a cement (350 kg/m$^3$) and finally fine granulates (825 kg/m$^3$).

Dry mixing was carried out for 1 minute.

The mixing water (182 kg/m$^3$ the water/cement ratio thus being 0.52) was then added over 30 seconds, while continually mixing.

The mixing was then continued for 2 minutes and 30 seconds.

The cement used was that marketed by the Company Lafarge under the tradename CPA HP 55. The water used was tap water. The granulates used were crushed granulates from the Loing mixed with sand from the Seine; the particle size distributions were as follows:

| | |
|---|---|
| 0/0.5 mm | 140 kg/m$^3$ |
| 0/1 mm | 455 kg/m$^3$ |
| 1/4 mm | 230 kg/m$^3$ |
| 4/10 mm | 245 kg/m$^3$ |
| 0/20 mm | 730 kg/m$^3$ |

For the control sample free of adjuvant, the mixing was stopped after 2 minutes and 30 seconds.

In the case of concrete samples containing an adjuvant and especially the composition according to the invention, the adjuvant, and especially the composition in the form of aqueous solutions containing 40% of dry matter, was introduced rapidly; mixing was then continued for an additional minute.

The concrete samples, to which an adjuvant had or had not been added, were subjected to slump tests with the slump cone (according to the ASTM standard C 143–66) at age "0"; then, the samples were left standing and then mixed again for 30 seconds just before carrying out the slump tests at ages of 60 and 120 minutes.

Prisms whose dimensions were 7 cm×7 cm×28 cm were prepared from samples of age "0"; these prisms were stored in a climatic chamber (20° C.±1° C.; relative humidity 90±5%).

dispersing agent B according to comparative test 3 and of the chelating stabilizing agent C according to comparative test 4.

The test of the composition according to the invention consisted in testing a concrete sample containing respectively 0.224, 0.064 and 0.042%, on a dry basis with respect to the cement, of the superplasticizing agent A according to comparative test 2, of the polycarboxylic polymer dispersing agent B according to comparative test 3 and of the chelating stabilizing agent C according to comparative test 4.

The results obtained in the abovesaid tests were combined in Table I.

TABLE I

|  | Percentage in constituents of the composition according to the invention | | | Water/ cement ratio | Slump measurement (in cm) (ASTM standard C 143-66) | | | CS (in MPa) | CS / CSc |
|---|---|---|---|---|---|---|---|---|---|
|  | A | C | B |  | At time 0 | After 60 minutes | After 120 minutes |  |  |
| Comparative test 1 | 0 | 0 | 0 | 0.52 | 9.0 | — | — | 13.7 | 100% |
| Comparative test 2 | 0.224 | 0 | 0 | 0.52 | 20.0 | 9.0 | 4.0 | 13.8 | 101% |
| Comparative test 3 | 0.224 | 0 | 0.064 | 0.52 | 23.0 | 17.0 | 9.0 | 13.7 | 100% |
| Comparative test 4 | 0.224 | 0.042 | 0 | 0.52 | 24.0 | 13.5 | 7.0 | 13.9 | 101% |
| Comparative test 5 | 0 | 0.042 | 0.064 | 0.52 | 14.0 | 8.0 | 4.0 | 12.5 | 91% |
| Composition according to the invention | 0.224 | 0.042 | 0.064 | 0.52 | 24.0 | 20.0 | 15.0 | 12.9 | 94% |

The compressive strengths CS were then measured after 24 hours and the ratio of CS with the value found for the control, that is to say CSc, was determined.

In order to illustrate the synergy obtained by using simultaneously the three constituents of the composition according to the invention, five comparative tests 1 to 5, explained below, and the test of a composition according to the invention were carried out.

Comparative test 1 consisted in testing a concrete sample to which no adjuvant had been added (control).

Comparative test 2 consisted in testing a concrete sample containing 0.224%, on a dry basis with respect to the cement, of a superplasticizing agent A consisting of the naphthalenesulphonate-formaldehyde condensate in the form of sodium salt, namely that marketed by the Applicant Company under the tradename GALORYL LH 120.

Comparative test 3 consisted in testing a concrete sample containing respectively 0.224% and 0.064%, on a dry basis with respect to the cement, of the superplasticizing agent A according to comparative test 2 and of a polycarboxylic polymer agent B consisting of the sodium polyacrylate with a number-average molecular mass of 1800, namely that marketed by the Company Coatex under the name 18–43 SC.

Comparative test 4 consisted in testing a concrete sample containing respectively 0.224% and 0.042%, on a dry basis with respect to the cement, of the superplasticizing agent A according to comparative test 2 and of the chelating stabilizing agent C consisting of the tetrasodium salt of 2-phosphonobutane-1,2,4-tricarboxylic acid.

Comparative test 5 consisted in testing a concrete sample containing respectively 0.064% and 0.042%, on a dry basis with respect to the cement, of the polycarboxylic polymer When examining the results combined in Table I, the synergetic effect obtained by the simultaneous use of three constituents of the composition according to the invention is clearly apparent.

This synergic effect is entirely unexpected and examination of the results of tests 2, 3, 4 and 5 makes it possible to confirm that the performances of the composition according to the invention is much better than the performances of any binary combination of its constituents taken in pairs and on the sum of the performances of each of these constituents.

The composition according to the invention imparts to plastic concrete an exceptional workability for a period of 2 hours after its preparation without affecting the mechanical strengths at the young age; the said composition also satisfies the AFNOR standard 18 333 which relates to superplasticizing adjuvants and which requires, on the part of a concrete containing a superplasticizer, a compressive strength at 24 hours greater than or equal to 85% of that of a control concrete free of superplasticizer for the same water/cement ratio.

The composition according to the invention is very particularly suitable for any application in which there is a delay between the time of preparation and that of finally putting the concrete into place. In particular, it is suitable for use in concrete plants; in that case, a delay of at most 2 hours may be desired to cover transportation by mixer truck to the site where the concrete is to be put into place; it is also suitable for pumping any cement-based product.

EXAMPLE 2

Study of the influence of the nature of the polycarboxylic polymer dispersing agent Concrete samples were prepared according to the protocol of Example 1 and they were made to contain a proportion of 0.8% of a number of compositions according to the invention containing 40% of dry matter differing from one another by the nature of the polycarboxylic polymer dispersing agent.

The constitution of the compositions according to the invention was:

67.84, on a dry basis, of the superplasticizing agent A according to Example 1

12.8%, on a dry basis, of the chelating stabilizing agent C according to Example 1

19.4%, on a dry basis, of a polycarboxylic polymer dispersing agent.

Different polycarboxylic polymer agents consisting of sodium polycarboxylates, commercial products of variable number-average molecular masses (determined by gel permeation chromatography and denoted by Mn) were employed; they are the following products:

Sodium polyacrylate (Mn 800) of the Company Coatex or NaPAA (1)
Sodium polyacrylate (Mn 1800) of the Company Coatex or NaPAA (2)
Sodium polyacrylate (Mn 2700) of the Company Norsohaas or NaPAA (3)
Sodium polyacrylate (Mn 5000) of the Company Coatex or NaPAA (4)
Sodium polyacrylate marketed by Rohm & Haas under the tradename "Tamol 983" or NaPAA (5)
Sodium polyacrylate marketed by Rohm & Haas under the tradename "Tamol 960" or NaPAA (6)
Sodium polyacrylate (Mn 750) of the Company Norsohaas or NaPAA (7)
Sodium polyacrylate (Mn 1400) of the Company Norsohaas or NaPAA (8)
Sodium polyacrylate (Mn 750) of the Company Coatex or NaPAA (9)
Sodium polyacrylate prepared by the process denoted by Synthesis S1 or NaPAA (10)

Copolymer of olefin! and of carboxylic acids prepared by the process denoted by Synthesis S2 or COPO (11).

Synthesis S1

80 g of cyclohexanone and 6.5 g of acrylic acid were charged to a 1 litre round-bottom flask equipped with a stirrer and a reflux condenser and made inert under nitrogen. The mixture was heated to 105°–110° C. and then a solution of 2.6 g of benzoyl peroxide in 30 g of cyclohexanone and 58.3 g of acrylic acid were run in simultaneously over 1 hour. After complete addition of the reactants, polymerization was continued for 3 hours at 115°–120° C. The reaction mixture was cooled to 90° C. and then 60 g on cyclohexanone were added; the mixture was neutralized with 120 g of 30% sodium hydroxide and diluted with 200 g of water. Separation was carried out by settling and the aqueous phase was distilled in order to completely remove the cyclohexanone. An acrylic polymer solution containing, as dry matter, 26.3% of NaPAA (10) with a Ubbelhode viscosity at 25° C. as a 25% solution of 13.6 MPa.s$^{-1}$ was obtained.

Synthesis S2

80 g of cyclohexanone, 33.6 g of diisobutylene (mixture of 2,4,4-trimethyl-1-pentene and of 2,4,4-trimethyl-2-pentene) and 14.7 g of maleic anhydride were charged to a i litre, three-necked round-bottom flask equipped with a stirrer and a reflux condenser and made inert under nitrogen. The mixture was heated to 105°–110° C. and then a solution of 3.2 g of benzoyl peroxide in 30 g of cyclohexanone and 32.4 g of acrylic acid were introduced simultaneously over 1 hour. Polymerization was continued for 4 hours at 115°–120° C. and the reaction mixture was then cooled to 90° C. and diluted with 60 g of cyclohexanone and 250 g of water. The polymer was neutralized with 100 g of 30% sodium hydroxide. The mixture was separated by settling and the aqueous phase was taken up again in order to remove the reaction solvent by distillation. A polymer solution containing 26% of COPO (11) as dry matter was obtained.

The slump measurements with the slump cone (according to the ASTM standard C 143–66) were carried out as in Example 1.

The compressive strength CS after 24 hours was also measured and the ratio of the value found to that, CSc, found for the control was determined.

The results of seven experiments [Control Experiment to Experiment 6] obtained with the control and the six polycarboxylic polymer dispersing agents NaPAA (1) to NaPAA (6) are combined in Table II.

TABLE II

| Experiment No. | Nature of the dispersing agent | Mn | Percentage composition according to the invention | Water/ cement ratio | Slump measurement (in cm) (ASTM standard C 143-66) | | | CS (in MPa) | CS/CSc |
|---|---|---|---|---|---|---|---|---|---|
| | | | | | At time 0 | After 60 minutes | After 120 minutes | | |
| Control | | | | 0.52 | 9 | | | 14.0 | 100% |
| 1 | NaPAA (1) | 800 | 0.8 | 0.52 | 23 | 21 | 14.0 | 11.8 | 84% |
| 2 | NaPAA (2) | 1800 | 0.8 | 0.52 | 23 | 20 | 15.5 | 12.3 | 88% |
| 3 | NaPAA (3) | 2700 | 0.8 | 0.52 | 23 | 19.5 | 13.5 | 12.9 | 92% |
| 4 | NaPAA (4) | 5000 | 0.8 | 0.52 | 22 | 18 | 12.0 | 12.1 | 86% |
| 5 | NaPAA (5) | — | 0.8 | 0.52 | 24 | 19 | 12.5 | 12.3 | 88% |
| 6 | NaPAA (6) | — | 0.8 | 0.52 | 23.5 | 20 | 13.0 | 12.6 | 90% |

Examination of the results combined in Table II shows that the acrylic and carboxylic polymer dispersing agents with number-average molecular masses between 800 and 5000 are acceptable as constituents of the composition according to the invention; preferably, however, the dispersing agents in question having a number-average molecular mass between 1500 and 3500 are used.

The short acrylic polymer dispersing agents have a more pronounced setting retarder effect, also noticeable on the compressive strengths at the young age, and the long acrylic polymers have a substantially inferior dispersing effect, measurable from the initial slump.

Moreover, and still to show the influence of the nature of the polycarboxylic polymer dispersing agent, a series of slump and occluded air measurements (according to ASTM standard C 231) was carried out on concrete samples to which a composition constituted as follows had been added:

68.3% on a dry/total dry basis of the superplasticizer A according to Example 1

9.7% on a dry/total dry basis of the chelating stabilizing agent C according to Example 1

22.0% on a dry/total dry basis of a carboxylic polymer dispersing agent.

Three comparative tests with acrylic polymer dispersing agents not forming part of those used according to the invention were first carried out.

In a comparative test 1, a polyacrylic dispersing agent of low number-average molecular mass (750) was used, namely NaPAA (7).

In a comparative test 2, a polyacrylic dispersing agent of high number-average molecular mass (7500) was used, namely NaPAA (9).

In a comparative test 3, the synthetic terpolymer denoted by COPO (11) was used.

Four other tests, denoted by "Invention Test 1" to "Invention Test 4", in which the polycarboxylic polymer dispersing agent forms part of those used according to the invention, were then carried out.

They were the products NaPAA (8), NaPAA (5), NaPAA (6) and NaPAA (10) identified above.

The results of the slump test and occluded air measurements are combined in Table III.

entrainment, which makes it possible to incorporate, at the time of formulation, air entraining agents intended exclusively for this purpose.

EXAMPLE 3

Study of the influence of the nature of the chelating stabilizing agent

Normal plastic concrete samples were prepared according to the protocol described in Example 1 and they were made to contain the composition according to the invention presented in the form of an aqueous solution containing 40% of dry matter, this composition comprising:

70% on a dry/total dry basis of the superplasticizer A according to Example 1

20% on a dry/total dry basis of a polycarboxylic polymer dispersing agent B according to Example 1 and 10% on a dry/total dry basis of a chelating stabilizing agent selected from the group comprising the seven following agents:

tartaric acid, sodium gluconate, 1-hydroxyethylidene-1,1-diphosphonic acid or HEDP, the trisodium salts of nitrilotriacetic acid or NTA, the pentasodium salt of aminotri(methylenephosphonic) acid or DEQUEST 2006 and the tetrasodium salt of 2-phosphonobutane-1,2,4-tricarboxylic acid or agent C of Example 1.

TABLE III

| Experiment | Nature of the dispersing agent | Mn | Dosis ** | Water/ cement ratio | Slump measurement (in cm) (ASTM standard C 143-66) | | | Occluded air (%) |
|---|---|---|---|---|---|---|---|---|
| | | | | | At time 0 | After 60 minutes | After 120 minutes | |
| Control | — | — | — | 0.54 | 6 | | | 3.1 |
| Comparative test 1 | NaPAA (7) | 750 | 0.8 | 0.54 | 24.5 | 15.5 | 9.0 | 2.8 |
| Comparative test 2 | NaPAA (9) | 7500 | 0.8 | 0.54 | 19.0 | 12.5 | 7.0 | 3.2 |
| Comparative test 3 | NaPAA (11) | — | 0.8 | 0.54 | 24.0 | 18.0 | 11.0 | 6.6 |
| Invention test 1 | NaPAA (8) | 1400 | 0.8 | 0.54 | 24.5 | 18.5 | 13.0 | 2.7 |
| Invention test 2 | NaPAA (5) | — | 0.8 | 0.54 | 25.0 | 18.5 | 12.5 | 2.6 |
| Invention test 3 | NaPAA (6) | — | 0.8 | 0.54 | 21.5 | 16.5 | 12.5 | 2.6 |
| Invention test 4 | NaPAA (10) | — | 0.8 | 0.54 | 22.0 | 15.0 | 12.0 | 2.7 |

** dosis expressed in cement —% in adjuvant at 40% of dry matter.

Examination of the results of Table III shows that the dispersing agents consisting of polyacrylates with a molecular mass less than 800 or greater than 5000 led to inferior performances over time than those obtained with polycarboxylic polymer dispersing agents according to the invention, in particular regarding the performances recorded 2 hours after preparation of the concretes.

Comparative test 3 shows that, in contrast to the dispersing agents comprising olefin-carboxylic acid copolymers in the salt form, the dispersing agents forming part of those according to the invention and constructed from homopolymers or copolymers of carboxylic acids in the salt form do not show an air entraining effect with respect to the control.

The composition according to the invention thus leads to an increased fluidification over time without causing air As a comparative test, one of the concrete samples was fluidified by means of the single superplasticizer A according to Example 1.

Eight experiments were thus carried out (the control, the experiments corresponding to the test of the six agents and the experiment corresponding to the comparative test).

The slump test (ASTM standard C 143-66) and compressive strengths CS at the young age (after 24 hours) were carried out; the ratio CS to CSc corresponding to the control was also calculated.

The results recorded are brought together in Table IV.

TABLE IV

| Experiments | Nature of the stabilizing agent | Dosis of composition | Water/cement ratio | Slump measurement (in cm) (ASTM standard C 143-66) | | | CS (in MPa) | CS/CSc |
| --- | --- | --- | --- | --- | --- | --- | --- | --- |
| | | | | At time 0 | After 60 minutes | Après 120 minutes | | |
| | Control | 0.8% | 0.52 | 7.0 | — | — | 12.8 | 100% |
| 1 | Tartric acid | 0.8% | 0.52 | 23.5 | 11.5 | 8.5 | 9.6 | 75% |
| 2 | Na gluconate | 0.8% | 0.52 | 22.0 | 12.5 | 10.5 | 11.3 | 88% |
| 3 | HEDP | 0.8% | 0.52 | 21.5 | 14.5 | 12.0 | 9.1 | 71% |
| 4 | NTA | 0.8% | 0.52 | 21.5 | 13.0 | 10.5 | 12.8 | 100% |
| 6 | DEQUEST 2006 | 0.8% | 0.52 | 23.0 | 18.5 | 14.0 | 13.6 | 106% |
| 7 | Agent C (ex. 1) | 0.8% | 0.52 | 22.5 | 20.0 | 15.5 | 12.3 | 96% |
| Comparative test | | 0.8% | 0.52 | 23.5 | 12.0 | 6.5 | 12.7 | 99% |

Examination of the results combined in Table IV shows that the chelating stabilizing agents contained by the composition according to the invention improve the fluidification for 2 hours after preparation of the concrete.

Hydroxycarboxylic acids and hydroxyphosphonic acids slightly improve the fluidification but cause a significant setting delay, which is harmful to the strengths at the young age.

The preferred chelating stabilizing agents forming part of the constitution of the composition according to the invention, which comprise aminocarboxylic and/or aminophosphonic groups, improve in an surprising way the fluidification over time of the concretes without having a negative influence on their compressive strength at the young age.

EXAMPLE 4

Study of the influence of the nature of the superplasticizing agent

Normal plastic concrete samples were prepared according to the protocol described in Example 1 and they were made to contain, except for the control, the composition according to the invention, presented in the form of an aqueous solution containing 40% of dry matter, comprising:

20% on a dry/total dry basis of a polycarboxylic polymer dispersing agent B according to Example 1, 10% on a dry/total dry basis of a chelating stabilizing agent C according to Example 1 and 70% on a dry/total dry basis of a superplasticizing agent consisting of one of those from the following group:
superplasticizing agent A according to Example 1, denoted by PNS (1)

superplasticizing agent marketed by the Company Bozetto under the name "OS 39", denoted by PNS (2)

superplasticizing agent marketed by the Company Kao Soap under the name "MIGHTY 150", denoted by PNS (3)

superplasticizing agent marketed by the Company Henkel under the name "LOPLARD", denoted by PNS (4)

superplasticizing agent marketed by the Company Chemie Linz under the name "LIQUIMENT N", denoted by PNS (5)

superplasticizing agent marketed by the Company SKW under the name "MELMENT PLAST" (sulphide-containing melamine), denoted by SCM (1)

superplasticizing agent marketed by the Company Chryso under the name "RESINE GT" (modified melamine), denoted by SCM (2)

superplasticizing agent consisting of a sodium lignosulphonate and marketed by the Company Lavebène, denoted by LNS (1)

superplasticizing agent consisting of a desugared sodium lignosulphonate and marketed by the Company Borregard, denoted by LNS (2)

superplasticizing agent consisting of a resin of a copolymerisate of sodium maleate and of sodium styrenesulphonate and marketed by the Company Arco Chemical under the name "résine SSMA 3000" [SSMA 3000 resin], denoted by PSS AM (1).

Eleven tests were carried out, one with the control and the other ten by successively using the superplasticizing agents shown above in the composition according to the invention.

In Tests 1 to 5, the superplasticizing agent used is from the class of condensates of formaldehyde and of naphthalenesulphonate (PNS).

In Tests 6 and 7, the superplasticizing agent used is from the class of sulphite-containing melamines (SCM).

In Tests 8 and 9, the superplasticizing agent used is from the class of lignosulphates (LNS).

In Test 10, the superplasticizing agent used from the class of copolymerisates of sodium polymaleate and of sodium polystyrenesulphonate (PSS AM).

As in the preceding examples, measurements were carried out of the slump over time with the slump cone and of the compressive strengths CS at the young age (after 24 hours) of the concrete samples thus constituted; the CS/CSc ratio was also determined, CSc being the compressive strength of the control after 24 hours.

Two comparative tests were also carried out which, in place of the composition according to the invention used in Tests 1 to 10, only the superplasticizing agent was used, the latter then being used in an amount equal to the amount of composition used in Tests 1 to 10.

In these two comparative tests, recourse was made respectively to the products PNS (1) and SCM (2).

The results are combined in Table V.

TABLE V

| Test | Nature of the superplasticizing agent | Dosis of the composition according to the invention | Water/ cement ratio | Slump measurement (in cm) (ASTM standard C 143-66) | | | CS (in MPa) | CS/CSc |
|---|---|---|---|---|---|---|---|---|
| | | | | At time 0 | After 60 minutes | After 120 minutes | | |
| 0 | Control | — | 0.52 | 7.0 | — | — | 13.6 | 100% |
| 1 | PNS (1) | 0.8 | 0.52 | 24.0 | 20.0 | 15.5 | 11.9 | 87% |
| 2 | PNS (2) | 0.8 | 0.52 | 23.0 | 20.0 | 14.5 | 11.6 | 85% |
| 3 | PNS (3) | 0.8 | 0.52 | 23.5 | 18.0 | 12.5 | 14.9 | 109% |
| 4 | PNS (4) | 0.8 | 0.52 | 22.0 | 16.0 | 12.0 | 11.7 | 86% |
| 5 | PNS (5) | 0.8 | 0.52 | 22.0 | 15.0 | 12.5 | 13.3 | 98% |
| 6 | SCM (1) | 0.8 | 0.52 | 21.0 | 12.5 | 8.5 | 13.8 | 101% |
| 7 | SCM (2) | 0.8 | 0.52 | 24.0 | 17.5 | 12.0 | 13.6 | 100% |
| 8 | LNS (1) | 0.8 | 0.52 | 20.0 | 13.5 | 9.5 | 12.7 | 93% |
| 9 | LNS (2) | 0.8 | 0.52 | 21.5 | 18.0 | 16.5 | 9.3 | 68% |
| 10 | PSS AM (1) | 0.8 | 0.52 | 24.0 | 16.5 | 13.0 | 9.0 | 66% |
| Comparative test 1 | PNS (1) | 0.8 | 0.52 | 20.5 | 10.0 | 5.5 | 14.8 | 109% |
| Comparative test 2 | SCM (2) | 0.8 | 0.52 | 18.0 | 8.5 | 4.0 | 15.6 | 115% |

Examination of the results combined in Table V shows that the concretes comprising the composition according to the invention have workabilities which, 2 hours after preparation of the said concretes, are greater than those of the concretes containing superplasticizers of the prior art.

The best results are obtained with superplasticizing agents of PNS and SCM types, which are preferred.

The superplasticizing agents of LNS and PSS AM types cause a setting-retarding effect which exerts a negative effect on the compressive strengths at the young age; these agents are less advantageous.

The superiority of the composition according to the invention with respect to the superplasticizing agent used alone results clearly from the two comparative tests.

EXAMPLE 5

Study of the proportions of the three constituents in the composition according to the invention Normal plastic concrete samples were prepared according to the protocol described in Example 1 and they were made contain, except for the control, the composition according to the invention, the latter comprising:

between 25 and 75% of a superplasticizing agent consisting of the agent A according to Example 1, between 0 and 10% of a chelating stabilizing agent consisting of the agent C according to Example 1 and between 20 and 75% of a polycarboxylic polymer dispersing agent consisting of the agent B according to Example 1.

The proportions effectively used for each of the abovesaid constituents of the composition according to the invention appear in Table VI below.

The results obtained for the slump test, the measurement of the compressive strength CS after 24 hours and the CS/CSc ratio (CSc corresponding to the control) carried out
with the control free of composition according to the invention,
with eleven compositions according to the invention in which the proportions of the constituents are shown,
with two comparative products (in comparative test 1, the composition contains only the agent B and, in comparative test 2, only the agent A), are thus combined in this table.

TABLE VI

| | Constitution of the composition (% dry/total dry) | | | Dosis of composition (%) | Water/ cement ratio | Slump measurement (in cm) (ASTM standard C 143-66) | | | CS (in MPa) | CS/CSc |
|---|---|---|---|---|---|---|---|---|---|---|
| | Agent A | Agent C | Agent B | | | At time 0 | After 60 minutes | After 120 minutes | | |
| Control | — | — | — | — | 0.54 | 7.0 | — | — | 14.9 | 100% |
| Test 1 | 70 | 10 | 20 | 0.8 | 0.54 | 21 | 18 | 14.5 | 12.7 | 85% |
| Test 2 | 70 | — | 30 | 0.8 | 0.54 | 23 | 16 | 11.5 | 16.1 | 108% |
| Test 3 | 60 | 10 | 30 | 0.8 | 0.54 | 23.5 | 19.5 | 15.5 | 13.5 | 91% |
| Test 4 | 60 | — | 40 | 0.8 | 0.54 | 24 | 16.5 | 12.5 | 15.4 | 103% |
| Test 5 | 50 | 10 | 40 | 0.8 | 0.54 | 22 | 17.5 | 13.5 | 11.3 | 76% |
| Test 6 | 50 | — | 50 | 0.8 | 0.54 | 22.5 | 19.5 | 15.0 | 14.2 | 95% |
| Test 7 | 55 | 5 | 40 | 0.8 | 0.54 | 23.5 | 19.5 | 14.5 | 13.3 | 89% |
| Test 8 | 45 | 5 | 50 | 0.8 | 0.54 | 23 | 20 | 16.5 | 12.2 | 82% |
| Test 9 | 65 | 5 | 30 | 0.8 | 0.54 | 23.5 | 19 | 14.0 | 14.3 | 96% |
| Test 10 | 55 | 2.5 | 42.5 | 0.8 | 0.54 | 24.0 | 19.5 | 14.0 | 14.3 | 96% |
| Test 11 | 25 | — | 75 | 0.8 | 0.54 | 21.5 | 19.0 | 14.5 | 12.6 | 85% |
| Comparative test 1 | — | — | 100 | | | 21.0 | 13.5 | 10.0 | 7.6 | 51% |
| Comparative test 2 | 100 | — | — | | | 20.5 | 12.0 | 5.5 | 14.8 | 100% |

From the examination of the results combined in Table VI, it appears that the composition according to the invention leads to a workability which, two hours after preparation of the concrete, is sufficient for the concrete to be put into place and pumped, whereas, with adjuvants according to the prior art (comparative tests 1 and 2), effectiveness only lasts for 45 to 60 minutes after preparation of the concrete.

Moreover, the concretes obtained with the composition according to the invention have a strength at the young age in agreement with the standard NFP 18 333 established with respect to superplasticizers.

Finally, comparative test I shows that the presence of the polycarboxylic dispersing agent alone causes a delay in setting of the said concretes.

EXAMPLE 6

The water-reduction properties of the composition according to the invention were studied.

A concrete was prepared and it was made to contain the composition according to the invention and was compared with a concrete free of composition prepared with the same cement charge and with the same aggregates (according to the protocol described in Example 3); the workability of the two concretes is the same at the starting time. The slumps over time of the two concretes and their compressive strengths at the young age were measured.

The results were combined in Table VII.

TABLE VII

| | | Control concrete | Concrete according to the invention |
|---|---|---|---|
| Concrete charge in composition/ cement (in %) | | 0 | 0.8% |
| Water/cement ratio | | 0.62 | 0.52 |
| Slump test (in cm) | at time 0 | 18 | 24.0 |
| (ASTM standard | after 60 minutes | — | 19.0 |
| C 143-66) | after 120 minutes | — | 11.0 |
| CS (in MPa) | | 11.3 | 15.9 |
| CS/CSc | | 100% | 141% |

Examination of the results combined in Table VII shows that the presence of the composition according to the invention confers on the concrete:

a very high reduction in water for an initial manageability greater than or equal to that of the control concrete, maintenance of this manageability over time and an increase in the strengths at the young age.

The composition according to the invention can thus be used for its function of a very high water-reducing agent in the manufacture of concretes.

The composition according to the invention can therefore be classed as a high water-reducing agent according to the NFP standard 18 330 which requires a compressive strength greater than or equal to 140% of that of the control, one day after the preparation.

We claim:

1. Composition used to improve rheological properties of cement products containing calcium ions and to increase the duration of the workability of ready to use concrete, comprising, in a ternary mixture:

from 5 to 95% by weight of a superplasticizing or water-reducing agent having a dispersing effect, from 0.1 to 50% by weight of a stabilizing agent capable of forming a chelate with the calcium ions of the cement product, and from 5 to 95% by weight of a polycarboxylic polymer dispersing agent.

2. Composition according to claim 1, wherein the chelating stabilizing agent is a phosphonic acid derivative of a polymer structure of the general formula:

$$\begin{array}{c} X_2PO_3CH_2 \\ \phantom{X_2PO_3CH_2}\diagdown \\ \phantom{XXXXXXX}N\text{—}(R\text{—}N\text{—})_n CH_2PO_3X_2 \\ \phantom{XXXXXXX}\diagup \phantom{XXX} | \\ X_2PO_3CH_2 \phantom{XXXX} CH_2PO_3X_2 \end{array} \quad (I)$$

in which:

n is an integer from 0 to 10,

R represents a carbon chain of alkylene or alkylene oxide structure of formulae:

$$(R_1\text{—}O\text{—}R_2) \quad \text{or} \quad (R_1\text{—}\underset{\underset{OH}{|}}{CH}\text{—}R_2)$$

in which $R_1$ and $R_2$ are alkyl groups comprising at least two carbon atoms,

X represents a hydrogen atom, an alkali metal, an alkaline-earth metal, ammonium, a protonated amine or a protonated alkanolamine.

3. Composition according to claim 1, wherein the chelating stabilizing agent is a phosphonic acid derivative of a polymer structure of the general formula:

$$\begin{array}{c} X_2PO_3CH_2 \\ \phantom{X_2PO_3CH_2}\diagdown \\ \phantom{XXXXXXX}N\text{—}(R\text{—}N\text{—})_n CH_2PO_3X_2 \\ \phantom{XXXXXXX}\diagup \phantom{XXX} | \\ X_2PO_3CH_2 \phantom{XXXX} CH_2PO_3X_2 \end{array} \quad (I)$$

in which:

n is an integer from 0 to 4,

R represents a carbon chain of alkylene or alkylene oxide structure of formulae:

$$(R_1\text{—}O\text{—}R_2) \quad \text{or} \quad (R_1\text{—}\underset{\underset{OH}{|}}{CH}\text{—}R_2)$$

in which $R_1$ and $R_2$ are alkyl groups comprising at least two carbon atoms,

X represents a hydrogen atom, an alkali metal, an alkaline-earth metal, ammonium, a protonated amine or a protonated alkanolamine.

4. Composition according to claim 1, wherein the chelating stabilizing agent is selected from the group consisting of:

aminotri(methylenephosphonic) acid, ethylenediaminetetra(methylenephosphonic) acid, diethylenetriaminepenta(methylenephosphonic) acid, hexamethylenediaminetetra(methylenephosphonic) acid and alkali metal, alkaline-earth metal, ammonium, amine and alkanolamine salts of the-above-mentioned phosphonic acids.

5. Composition according to claim 1, wherein the chelating stabilizing agent is a polymer represented by the general formula;

$$X_2O_3P\text{—}CH_2\text{—}[N\text{——}\underset{\underset{X_2O_3P}{|}}{\underset{CH_2}{|}}\text{C}\underset{\parallel}{\phantom{X}}\text{—}N\text{—}\underset{\underset{PO_3X_2}{|}}{\underset{CH_2}{|}}CH_2]_n\text{—}PO_3X_2 \quad (II)$$

in which:

n is an integer equal to or greater than 1,

X represents a hydrogen atom, an alkali metal, an alkaline-earth metal, ammonium, a protonated amine or a protonated alkanolamine.

6. Composition according to claim 1, wherein the chelating stabilizing agent is a gem-hydroxyphosphonic compound of general formula:

in which:

R$_1$ represents a hydrogen atom or an alkyl group,

R$_2$ represents a hydrogen atom, an alkyl group or the PO$_3$X$_2$ group, and

X represents a hydrogen atom, an alkali metal, an alkaline-earth metal, ammonium, a protonated amine or a protonated alkanolamine.

7. Composition according to claim 1, wherein the stabilizing agent is selected from the group consisting of 1-hydroxyethylidene-1,1-diphosphonic acid and salts thereof.

8. Composition according to claim 1, wherein the chelating stabilizing agent is a compound of general formula:

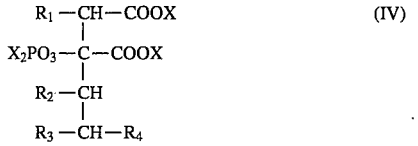

in which:

R$_1$ and R$_3$ represent a hydrogen atom or an alkyl group comprising from 1 to 4 carbon atoms, R$_2$ represents a hydrogen atom, an alkyl or carboxyalkyl group, R$_4$ represents a carboxyalkyl, carboxyamido or cyano group and X represents a hydrogen atom, an alkali metal, an alkaline-earth metal, ammonium, a protonated amine or a protonated alkanolamine.

9. Composition according to claim 1, wherein the chelating stabilizing agent comprises alkali metal, alkaline-earth metal, ammonium, protonated amine or protonated alkanolamine salts of 2-phosphonobutane-1,2-dicarboxylic acid or 2-phosphonobutane-1,2,4-tricarboxylic acid.

10. Composition according to claim 1, comprising from 50 to 90% by weight of at least one superplasticizing agent selected from the group consisting of alkali metal and alkaline-earth metal formaldehyde-naphthalenesulphonate condensates, alkali metal lignosulphonates, alkaline-earth metal lignosulphonates, sulphite-containing melamines, alkali metal polystyrenesulphonates, alkaline-earth metal polystyrenesulphonates, alkali metal salts of styrene-maleic anhydride copolymers and alkaline-earth metal salts of styrene-maleic anhydride copolymers, from 0.1 to 25% by weight of at least one stabilizing agent which chelates calcium ions selected from the group consisting of polyalkylenepolyamino(methylenephosphonic) acids, polyalkylenepolyamino (methylenephosphonic) salts, urea-formaldehyde condensates modified by addition of methylenephosphonic groups, gem-hydroxyphosphonic compounds and 2-phosphonobutane-1,2-dicarboxylic acid salts, and from 5 to 80% by weight of a polycarboxylic polymer dispersing agent consisting of an alkali metal polycarboxylate.

11. Composition according to claim 1, comprising from 5 to 40% by weight of an alkali metal polycarboxylate, from 0.1 to 20% by weight of a calcium-chelating stabilizing agent selected from the group consisting of a polyalkylene-polyamino(methylenephosphonic) acid, a derivative of 2-phosphono-butane-1,2-dicarboxylic acid or 2-phosphono-butane-1,2,4-tricarboxylic acid and alkali metal, alkaline-earth metal, ammonium, amine and alkanolamine salts of the above-mentioned phosphonic acids, the balance to 100% by weight of the composition consisting of a superplasticizing agent consisting of an alkali metal formaldehyde-naphthalenesulphonate condensate.

12. Process for improving rheological properties of cement products and for increasing the duration of the workability of ready to use concrete, comprising the step of adding to said cement products separately from one another in any order a first component consisting of a superplasticizing or water-reducing agent having a dispersing effect, a second component consisting of a stabilizing agent capable of forming a chelate with the calcium ions of the cement product and a third component consisting of a polycarboxylic polymer dispersing agent, wherein the first, second and third components represent a total proportion with respect to the cement from 0.1 to 1.0 by weight of dry matter and the respective proportions of each of the three components being from 5 to 95% by weight of the first component, from 0.1 to 50% by weight of the second component, and from 5 to 95% by weight of the third component.

13. Composition according to claim 1, wherein the polycarboxylic dispersing agent has a number-average molecular weight of 500 to 15,000 determined by gel permeation chromatography (GPC).

14. Composition according to claim 1, wherein the polycarboxylic dispersing agent has a number-average molecular weight of 500 to 10,000 determined by gel permeation chromatography (GPC).

15. Composition according to claim 1, wherein the polycarboxylic dispersing agent has a number-average molecular weight of 800 to 3,500 determined by gel permeation chromatography (GPC).

16. Cement product comprising, with respect to the cement, a proportion from 0.1 to 1.0% by weight of dry matter of a composition comprising, in a ternary mixture, from 5 to 95% by weight of a superplasticizing or water-reducing agent having a dispersing effect, from 0.1 to 50% by weight of a stabilizing agent capable of forming a chelate with the calcium ions of the cement product, and from 5 to 95% by weight of a polycarboxylic polymer dispersing agent.

17. Process for improving the rheological properties of cement products and for increasing the duration of the workability of ready to use concrete, comprising the step of adding to said cement products, with respect to the cement, a proportion of from 0.1 to 1.0% by weight of dry matter of a composition comprising, in a ternary mixture, from 5 to 95% by weight of a superplasticizing or water-reducing agent having a dispersing effect, from 0.1 to 50% by weight of a stabilizing agent capable of forming a chelate with the calcium ions of the cement product, and from 5 to 95% by weight of a polycarboxylic polymer dispersing agent.

* * * * *